A. C. WILSON.
DIMMER LENS.
APPLICATION FILED DEC. 20, 1917.
1,274,648.
Patented Aug. 6, 1918.
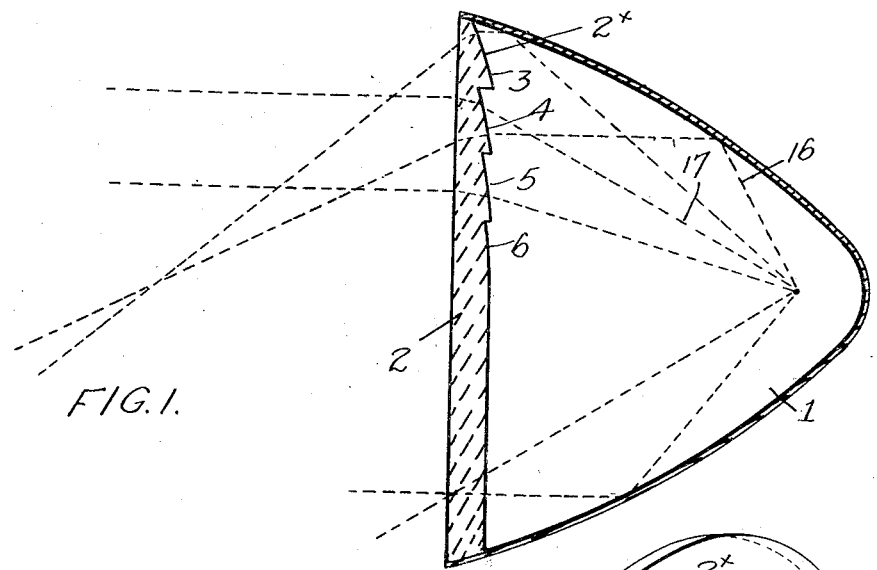
FIG.1.
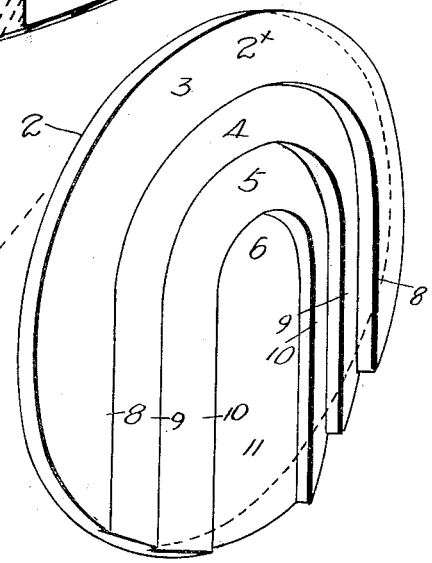
FIG.3.
FIG.2.
INVENTOR
ALEXANDER. C. WILSON.
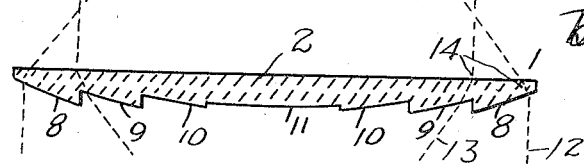

UNITED STATES PATENT OFFICE.

ALEXANDER CURRY WILSON, OF TORONTO, ONTARIO, CANADA.

DIMMER-LENS.

1,274,648.

Specification of Letters Patent.

Patented Aug. 6, 1918.

Application filed December 20, 1917. Serial No. 208,100.

*To all whom it may concern:*

Be it known that I, ALEXANDER CURRY WILSON, of the city of Toronto, in the county of York, in the Province of Ontario, Canada, have invented certain new and useful Improvements in Dimmer-Lenses, of which the following is the specification.

My invention relates to improvements in headlight dimming lenses and the object of the invention is to devise a lens by which the field of light is spread laterally at the same time providing means whereby the rays directed upward from the light source are deflected downward from their normal directions and it consists essentially of a circular lens having a face the upper portion of which is convexed in the form of a sphere segment and the lower portion convexed in the form of a vertical cylinder segment as hereinafter more particularly explained.

Figure 1, is a sectional view of a lens constructed in accordance with my invention and inserted in a parabolic reflector.

Fig. 2, is a sectional plan view through the lens.

Fig. 3, is a perspective detail of the lens.

In the drawing like letters of reference indicate corresponding parts in the various figures.

1 indicates a parabolic reflector of any suitable type. 2 is my lens the upper portion of which has a face formed convex at $2^x$. The convex face $2^x$ is provided with a plurality of concentrically stepped portions 3, 4, 5 and 6 forming concentric prism like portions the faces of which are substantially of the same convexity.

The lower portion 4 of the lens is convexed in the form of a vertical cylinder segment which is correspondingly stepped to the upper portion of the lens to form vertical parallel prism like portions 8, 9, 10 and 11 which are continuous with the portions 3, 4, 5 and 6 of the upper portion of the lens hereinbefore described.

By referring to Fig. 2, it will be seen that the lateral rays indicated by the dotted lines 12 and 13 directed from the source of light are refracted at 14 so as to be directed inwardly and intersect at the focal point 15 from thence spreading outward in fan shape at each side of the normal field of light thereby extending such field laterally.

The upward extended rays indicated by the dotted lines 16 and 17 are also refracted so as to be directed either horizontally parallel to the reflected rays of the reflector or downward onto the surface of the ground.

From this description it will be seen that I have provided a simple means whereby not only are the rays passing upward deflected so that they do not pass in such upward direction but the side rays are deflected so as to increase laterally the field of light so that the driver is not only provided with a direct forward light but also a light at each side of the car.

What I claim as my invention is:

1. A headlight dimming lens comprising an upper portion convexed and stepped to form a plurality of concentric prism like portions and a lower vertical portion having vertical prism like portions forming extensions of the concentric prism like portions.

2. A headlight dimming lens comprising a lens of a shape to fit a headlight, and inverted elongated U-shaped ridges on the inner face of the lens, the lower ends of the ridges extending vertically and parallel to each other.

ALEXANDER CURRY WILSON.

Witnesses:
R. MOFFAT,
A. POWELL.